US009081265B2

(12) United States Patent
Spaulding et al.

(10) Patent No.: US 9,081,265 B2
(45) Date of Patent: Jul. 14, 2015

(54) DECENTRALIZED INTELLIGENT NODAL LIGHTING SYSTEM

(71) Applicants:Jeremy Spaulding, Marblehead, MA (US); Jeffrey Holt, Concord, NH (US); Mervyn Anthony, Waltham, MA (US); Karlin Jessen, Reading, MA (US)

(72) Inventors: Jeremy Spaulding, Marblehead, MA (US); Jeffrey Holt, Concord, NH (US); Mervyn Anthony, Waltham, MA (US); Karlin Jessen, Reading, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 148 days.

(21) Appl. No.: 13/716,773

(22) Filed: Dec. 17, 2012

(65) Prior Publication Data

US 2014/0168610 A1    Jun. 19, 2014

(51) Int. Cl.
*G03B 21/26* (2006.01)
*G03B 21/00* (2006.01)
*H04N 9/31* (2006.01)
*H05B 37/02* (2006.01)

(52) U.S. Cl.
CPC .............. *G03B 21/00* (2013.01); *H04N 9/3105* (2013.01); *H04N 9/3152* (2013.01); *H04N 9/3197* (2013.01); *H05B 37/029* (2013.01); *H05B 37/0272* (2013.01); *Y02B 20/48* (2013.01)

(58) Field of Classification Search
CPC . H04N 9/3105; H04N 9/3152; H04N 9/3197; H05B 33/0818; H05B 33/0869; H05B 37/02; H05B 37/0272
USPC ......... 315/15, 31, 85, 94, 122, 154, 294, 308, 315/312, 315; 362/249.02, 459, 479, 466, 362/465, 555, 558, 800
See application file for complete search history.

(56) References Cited

U.S. PATENT DOCUMENTS

| | | | |
|---|---|---|---|
| 6,575,577 B2 * | 6/2003 | Beliveau | 353/31 |
| 2007/0045640 A1 * | 3/2007 | Erchak et al. | 257/98 |
| 2008/0013050 A1 * | 1/2008 | Boute et al. | 353/10 |
| 2009/0218951 A1 * | 9/2009 | Weaver | 315/154 |
| 2009/0248419 A1 * | 10/2009 | Spaulding et al. | 704/275 |
| 2011/0119489 A1 * | 5/2011 | Garcia Morchon et al. | 713/169 |
| 2011/0305200 A1 * | 12/2011 | Schoofs et al. | 370/328 |

FOREIGN PATENT DOCUMENTS

WO   2012145766 A2   10/2012

* cited by examiner

*Primary Examiner* — Sultan Chowdhury
(74) *Attorney, Agent, or Firm* — Andrew Martin (57) ABSTRACT

Techniques are disclosed for providing a decentralized intelligent nodal lighting system. The intelligent nodal lighting system may be controlled using a wireless protocol, such as Wi-Fi, and each lighting node in the system may have its own independent Wi-Fi address and may receive, store, and interpret commands from a wirelessly connected controller. Each intelligent light node may contain a CPU and memory for storing and interpreting commands from the controller to achieve a desired light color, intensity, or quality. In some embodiments, individual lighting nodes may be dynamically added or removed from the lighting system without interrupting the system's operation.

19 Claims, 5 Drawing Sheets

DECENTRALIZED INTELLIGENT NODAL LIGHTING SYSTEM

FIELD OF THE DISCLOSURE

The present application relates to lighting systems, and more specifically to wirelessly connected nodal lighting systems.

BACKGROUND

Wirelessly controlled lighting system design, as well as other lighting system designs, involves a number of non-trivial challenges, and multi-element wirelessly controlled lighting systems have faced particular complications.

DETAILED DESCRIPTION

Techniques are disclosed for providing a decentralized intelligent nodal lighting system. The intelligent nodal lighting system may be controlled using a wireless protocol, such as Wi-Fi, and each light unit (or node) in the system may have its own independent Wi-Fi address and may act independently upon commands from a wirelessly connected controller. Each intelligent light node may contain a CPU and memory for storing and interpreting commands from the controller to achieve a desired light color, intensity, or quality. The CPU within each intelligent lighting node can intelligently assess the controller commands and determine whether the desired light settings are within the capabilities of the individual light unit. If the settings are outside the capabilities of the light unit, the CPU may calculate the best available response and output the closest light settings to those requested by the controller. Numerous other configurations and variations will be apparent in light of this disclosure.

General Overview

As previously explained, wirelessly connected lighting system design involves a number of non-trivial challenges. The individual lighting units of lighting systems only passively receive power and/or output commands from a central lighting tuner or controller and all the intelligence of the system is be located in the controller. In such a system, the controller is required to identify and configure each lighting unit and the entire system operation generally needs to be paused if an individual lighting unit is added or removed from the system. Additionally, it may be desirable to create a nodal lighting system that is capable of recreating various lighting experiences encountered in real life. Such a system may be implemented, for instance, in the dressing room of a store where a customer may want to see how an article of clothing, an accessory, or any other object appears in different lighting environments prior to purchasing the object. Such a system may alternatively be implemented in a home, office, theatre, restaurant, or any other location where one might wish to recreate a specific lighting environment. It may also be desirable to include one or more audio or visual nodes that may work in concert with the lighting nodes in order to create a more immersive environment.

Thus, and in accordance with an embodiment of the present invention, a decentralized intelligent nodal lighting system is disclosed. The techniques disclosed can be fully implemented using one or more intelligent lighting nodes, a Wi-Fi network (or other wireless protocol network) router, and a Wi-Fi enabled controlling device, in accordance with one embodiment. Each light unit in such an example system may be an independent node in a lighting array, each node having its own network address for transmitting and receiving communications from the controller. Each lighting node may include an onboard intelligent control unit, allowing the node to receive, store, interpret, and act upon commands received from the controller. In some embodiments, the lighting array may be complemented by a Wi-Fi enabled active background display such as a projected image or video, and/or may also be complemented by an audio system. Each intelligent lighting node may communicate over the Wi-Fi network with the controller, any other nodes in the intelligent lighting system, and any other Wi-Fi enabled device within the network. Such a lighting system may be portable and easily reconfigurable and deployable, and each intelligent lighting node may actively communicate with the controller and identify itself with a unique ID number, thus allowing individual lighting nodes to be dynamically added or removed from the system as desired. In such an example, each node can self-identify and configure itself with the lighting system without the controller needing ID and configuration information regarding each lighting node prior to system operation. In some embodiments, the lighting node may assess the controller commands and determine whether the desired system settings are within the capabilities of the individual lighting unit. In such an embodiment, the lighting node may intelligently calculate and output the closest alternative settings if those requested by the controller cannot be supported by the particular lighting unit.

Intelligent Nodal Lighting System

Figure 1:
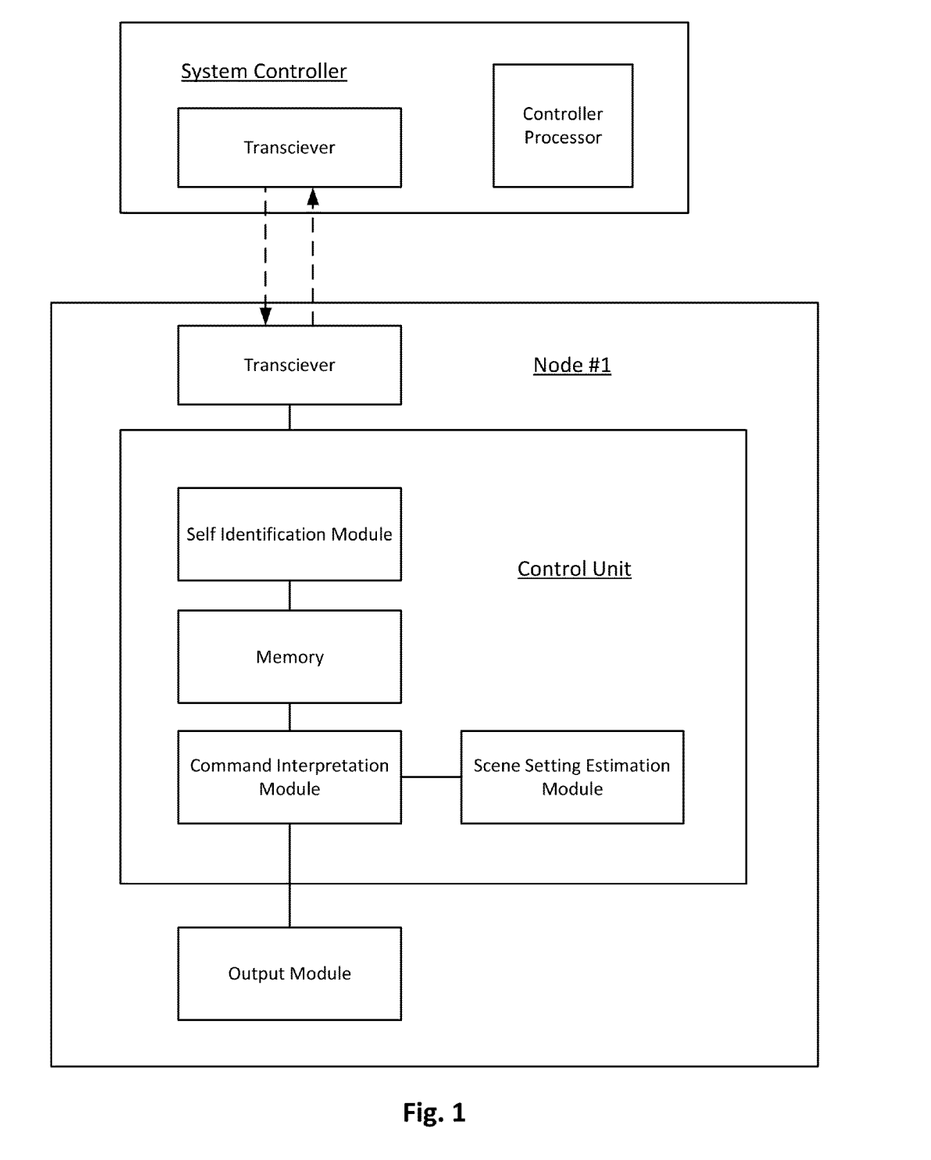
FIG. 1 shows a block diagram of a lighting system controller and an intelligent node, according to one embodiment of the present invention.

FIG. 1 illustrates a block diagram of a lighting system controller and an intelligent node, according to one embodiment of the present invention. As can be seen, in this particular example embodiment, the controller includes a controller processor, as well as a wireless transceiver that can be connected to a wireless network. In one embodiment the controller need not be a device specialized for the specific lighting system and may be a mobile phone, a tablet computer, or any other suitable wirelessly enabled device. In example embodiment, the wireless network may be a Wi-Fi network, although any other suitable wireless protocol may be used and the techniques disclosed are not limited to any particular communications protocol. The controller in this example is wirelessly connected to an intelligent node, Node #1. For simplicity of explanation, the controller is shown to only be connected with one node, however any number of nodes may be connected with the controller and the individual nodes may also be wirelessly connected with each other. In this example, the node includes a transceiver that may wirelessly communicate with the controller, as well as with any other Wi-Fi enabled device within the network. The transceiver of the node may be connected to a control unit, and in this particular example the control unit includes memory, a self-identification module, a command interpretation module, and a scene setting estimation module. In one particular example, the control unit memory may store a unique identification number for each intelligent node in the lighting system, as well as configuration and characterization information regarding the node.

This information may be used to calculate and activate an individual communication channel between the node and the controller. The individual communication channel may allow each node in a system to be controlled independently, thus creating a more dynamic lighting environment. The self-identification module in this example is connected to memory and allows the control unit to communicate identification and configuration information regarding the node to the system controller. The self-identification module may initiate or respond to handshake and discovery protocols from the system controller, or from any other wirelessly enabled device within the network. Each intelligent lighting node may be assigned a unique network address, and this network address may be stored in the node's memory. In such an example embodiment, the system controller does not need to be pre-programmed with identification and configuration information regarding each of the nodes because it can receive this information from each intelligent node in the system.

The control unit in one example embodiment also includes a command interpretation module that may also be connected to memory. In such an embodiment, the command interpretation module and memory allow the control unit to receive, store, and interpret commands and scene settings that are received from the system controller. In one particular example, the intelligent node may be a lighting node, and the scene settings communicated from the controller may be desired color, intensity or light quality settings. In other embodiments, the node may be an audio or visual node, in which case the scene settings communicated from the controller may be a desired image, video, or audio output corresponding to a particular lighting environment. In one particular embodiment, the command interpretation module may be capable of supporting multiple color metric spaces (including: n-channel color level and/or XYZ Tristimulus values) and may contain conversion algorithms to process and display the intended color, intensity and light quality requested by the controller. The command interpretation module may contain algorithms that, when given a target color point (in the XYZ Tristimulus color space, for example), intensity value, or light quality value, enable the module to calculate what individual lighting values to produce. If the scene settings communicated from the controller are within the capabilities of the lighting node, the command interpretation module may interpret and communicate these scene settings to an output module, also located within the intelligent lighting node. The output module may be one or more lighting elements and may output the desired color, intensity, and quality of light requested by the controller. In one particular embodiment, the output of the lighting node may smoothly transition between light output color or intensity with a delay that can be remotely configured by the controller.

In one particular example, the node is an intelligent lighting node and the desired color, intensity, or lighting settings requested by the controller are not within the capabilities of the particular light unit. In such a case, the control unit may also include a scene setting estimation module connected to the command interpretation module. In one particular example, the scene setting estimation module may receive the scene settings from the command interpretation module and estimate the closest possible light settings that the lighting node is capable of outputting. If the controller requests lighting settings outside the color gamut range of a particular lighting element, the scene setting estimation module may contain algorithms that may determine the closest possible match to the intended color. After calculating the closest light settings that the node is capable of outputting, the scene setting estimation module may communicate these new settings to the command interpretation module, which may then send the new settings to an output module within the intelligent lighting node. The output module may then output the newly calculated scene settings. In such an example embodiment, the scene setting estimation module allows the intelligent lighting node to determine its own limitations and to provide the closest possible lighting environment to the one requested by the system controller. Because the limitations of one lighting node may be compensated for by another lighting node in the system, each of the nodes may communicate with each other. Such communications may also be useful when a lighting node is added or removed from the system, as the remaining nodes may need to increase or decrease their intensity in order to compensate for the added or removed node. These communications between nodes may be essential to calculating the closest possible lighting value to the value transmitted from the controller.

In one particular example, the combination of a self-identification module, a command interpretation module, and a scene setting estimation module allows the system controller to request a particular target lighting environment without other system configuration or performance information (such as number of channels, emitter types, drive currents, temperature, etc.) being stored at the controller. These variables may be interpreted and accounted for at each of the intelligent lighting nodes, allowing for a decentralized intelligent lighting system. Each intelligent lighting node may be capable of intelligently making decisions to accept and process handshakes, data feeds, and commands from the controller. The processors, control units, memory, and modules described above may be implemented in software, hardware, firmware, or any combination thereof, as will be appreciated in light of this disclosure. Likewise, the algorithms described may also be implemented in software, hardware, firmware, or any combination thereof, as will be appreciated in light of this disclosure.

Figure 2A:
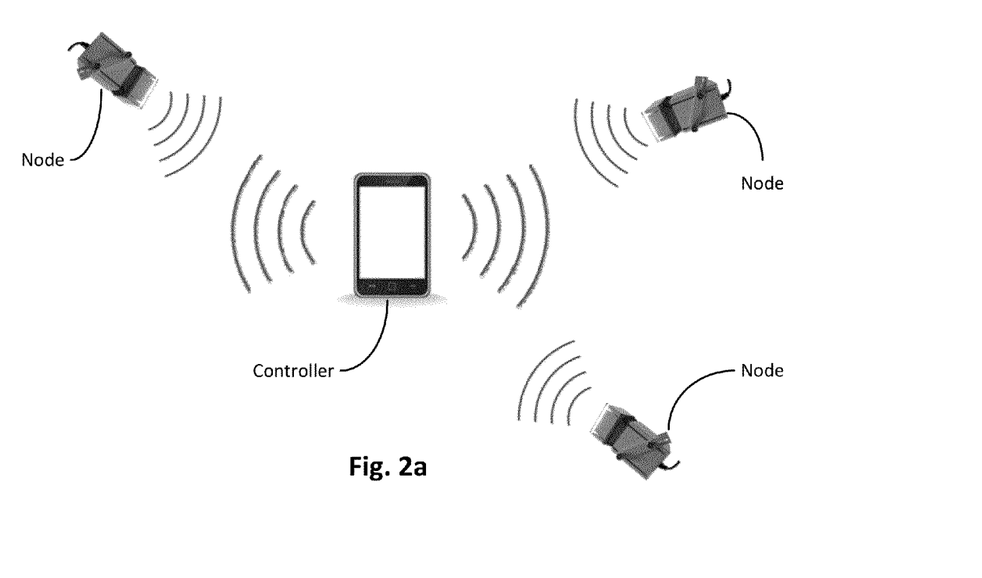
FIG. 2a-2c illustrate example intelligent nodal lighting system configurations, according to one embodiment of the present invention.
Figure 2B:
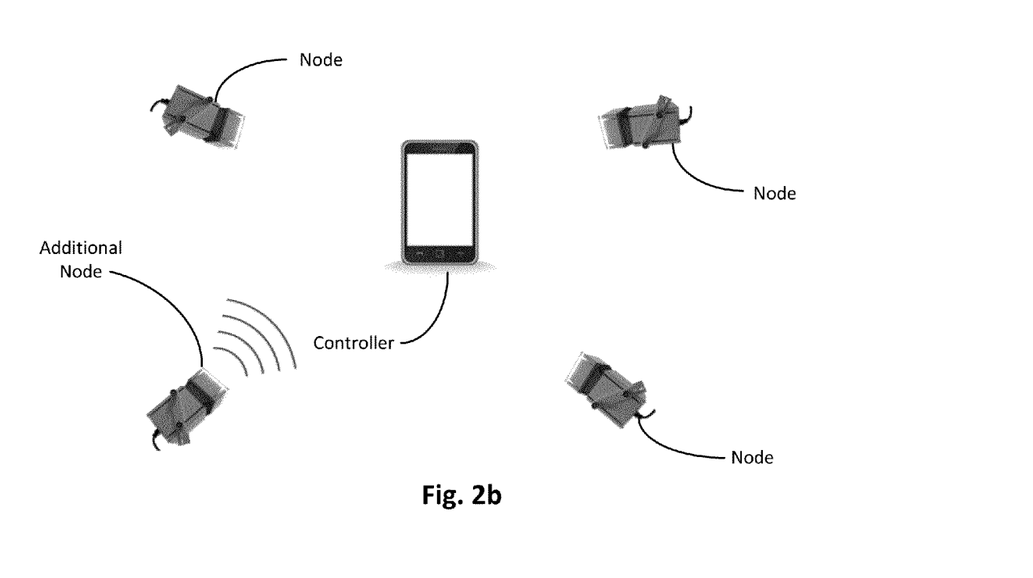
Figure 2C:
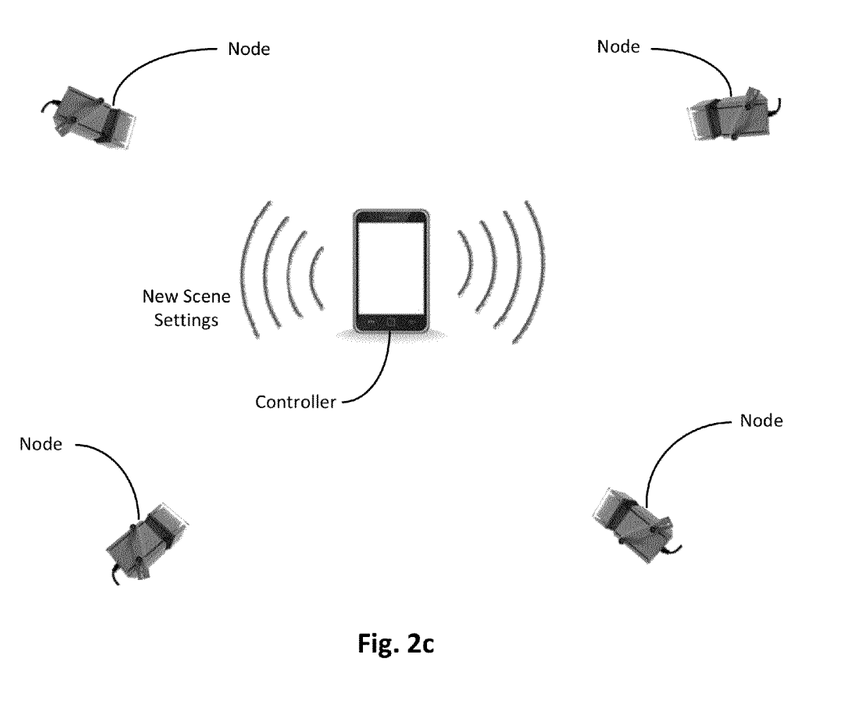

FIGS. 2a-2c illustrate example intelligent nodal lighting system configurations, according to one embodiment of the present invention. FIG. 2a illustrates a system controller and three intelligent lighting nodes, all wirelessly enabled. In one particular embodiment, the system controller begins an initialization routine by broadcasting a signal to any wirelessly enabled devices within the network. In response to the controller signal, each intelligent lighting node may respond with its individual ID numbers and current IP settings. The lighting nodes may be programmed to promptly respond to identification attempts made by the controller and may disable themselves for a predetermined period from acknowledging future requests by the controller once they are registered in the controller. This may be done to mitigate potential network traffic congestion. In an alternative embodiment, the individual lighting nodes may actively attempt to identify themselves with unique ID numbers to the controller until they receive acknowledgement from the controller. Once identified to the controller, the lighting nodes may be assigned any network address from a Wi-Fi router. Once assigned a network address, the lighting nodes may remain in the system array as long as the address has been communicated during the node discovery phase. In one example embodiment, the lighting node may be configured by the controller to send a periodic pulse message at fixed intervals to indicate that the node is "awake." These pulse messages may be necessary to prevent the processor within the lighting node from going to power saving or sleep mode when unused for a period of time, as that would otherwise cause increased latency during a scene change. In another example embodiment, the lighting node may reconfigure an encoded LED output characterization value (which may be critical information for displaying the desired color) when LED panels in the lighting system are changed, or because of inherent temperature degradation, or to offset aging effects.

In one embodiment, after the lighting nodes have been assigned a network address and are in communication with the controller, the controller may communicate scene settings to one or all of the individual lighting nodes. The scene settings may be based on a pre-programmed scene or lighting environment that is intended to be recreated by the lighting system. In one embodiment, the controller processor includes memory that contains scene setting information regarding a number of contextual lighting environments. In one example embodiment, the lighting system includes audio and visual nodes, in addition to lighting nodes, and the scene settings may include an audio feed, video feed, or a particular image that can create an immersive audio and visual environment along with the lighting environment. After initial scene settings have been transmitted to the lighting nodes, if a scene change is desired the controller may communicate new scene settings to one or more of the nodes. When changing scenes it may be desirable for each of the individual lighting nodes to work in a coordinated manner relative to each other by changing values at the same time in order to more smoothly transition between scenes as requested by the system controller.

In one embodiment, the scene settings may include light spectra measured at a particular location (for example a beach or a ballroom) and may also be communicated to the controller wirelessly in real-time instead of being pre-programmed or saved at the controller. In such an embodiment, each of the nodes, as well as the controller, may be on a network and may be wirelessly connected to sensors or servers at remote locations. Such sensors or servers may capture or aid in providing the scene settings, in certain embodiments. In particular examples, the remote source may be a social network, a news feed, a weather feed, or sensors located at a specific location to provide real-time scene settings.

Efficient communication between the controller and multiple nodes may require low latency and high data integrity in order to ensure that the light units receive their appropriate requests. In one example embodiment, a relatively high data delivery rate may be achieved if the same data packets are sent multiple times with an increasing exponential delay. In another embodiment, a relatively high data delivery rate may be achieved if the data packets re-sent after a determined time interval. One example network protocol that may be implemented in a decentralized intelligent nodal lighting system supports a large number of intelligent lighting nodes to communicate with the controller simultaneously. In such an example, the number of nodes in a lighting system may be scalable and may only be limited by the number of devices supported by a given network. For example, many consumer networks support 256 channels, of which four channels may be taken up by reserved "0" address, controller, router, and broadcaster addresses. In such an example, the number of intelligent lighting nodes supported by the system would be limited to 252.

FIG. 2b illustrates an example intelligent nodal lighting system wherein an additional node is being dynamically added to the lighting system, according to one embodiment of the present invention. Individual lighting nodes may join or be removed from the system array dynamically without pausing system operation. In one particular embodiment, the added node may transmit identification information itself without the system controller having any pre programmed configuration data for the additional node. The additional node may alternatively respond to an initialization request that may be transmitted by the controller during system operation. In one embodiment, after communicating its identification information and network address to the controller, the additional node may begin receiving scene setting commands from the controller.

FIG. 2c illustrates the intelligent nodal lighting system of FIG. 2b, after the additional node has been incorporated within the lighting system. Once the node has been dynamically added to the system, it may communicate with the other lighting nodes and operate within the system along with the other nodes. FIGS. 2a-2c illustrate an example where a lighting node is added to the system, but any of the existing lighting nodes may also be dynamically removed from the system without pausing system operation. After a lighting node has been added or removed from the system, the controller may need to communicate new scene settings to the lighting nodes in order to adjust the lighting levels in response to the added or removed lighting node.

Methodology

Figure 3:
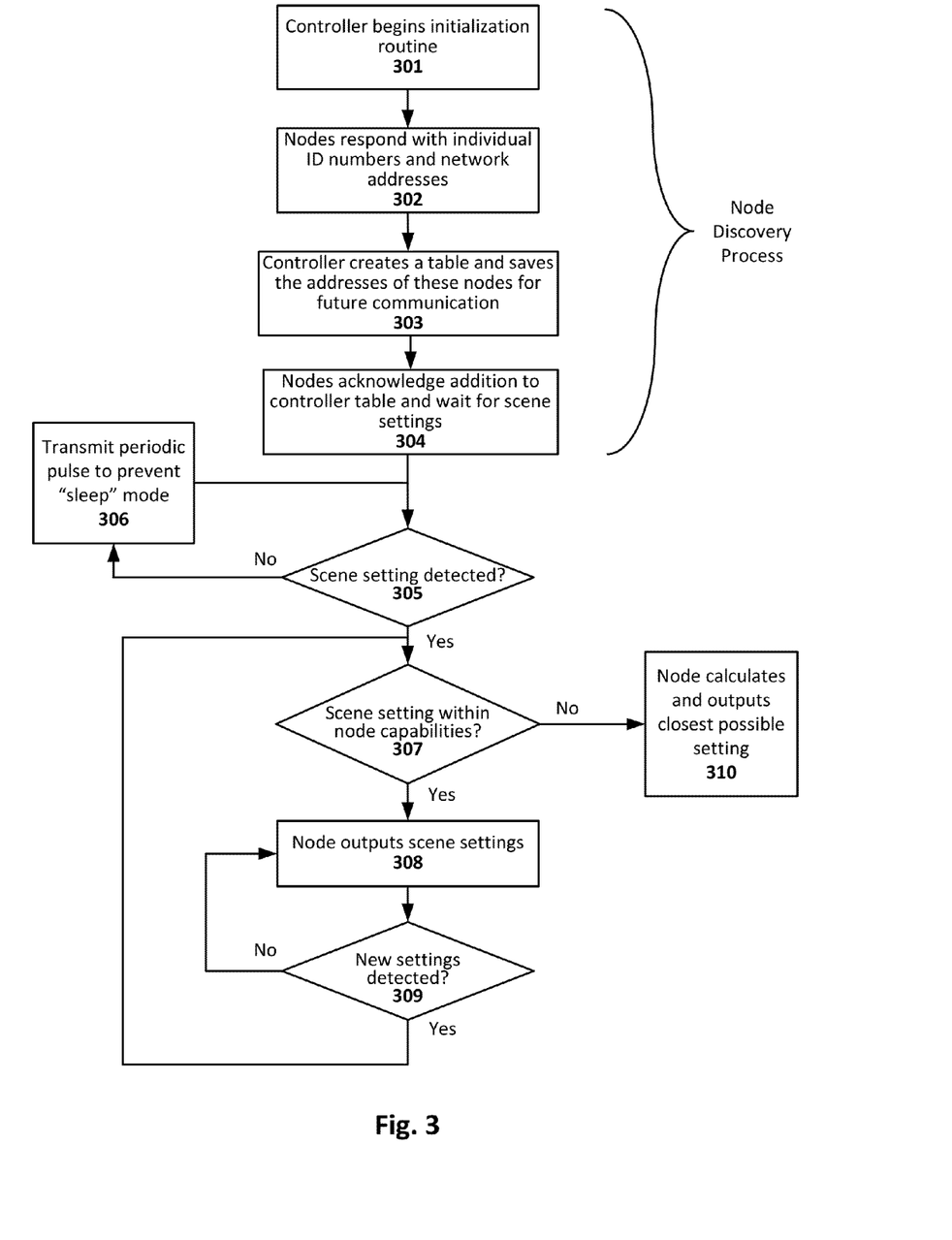
FIG. 3 shows a flow diagram of a method for displaying a desired lighting environment, according to one embodiment of the present invention.

FIG. 3 is a flow diagram illustrating a method for displaying a lighting environment, according to one embodiment of the present invention. In this particular example, the method begins with a node discovery process. The node discovery process may begin with the controller transmitting an initialization routine 301, wherein the controller broadcasts a signal searching for any wirelessly enabled devices within the network. In response to this broadcast, any intelligent lighting nodes within the network may respond by identifying themselves 302 to the system controller with individual ID numbers and network addresses. In one example, the network addresses may be assigned to each node by the Dynamic Host Configuration Protocol (DHCP) server maintained by the Wi-Fi router. The method may continue with the controller collecting 303 the network address and unique ID number from each node and creating a table for future communications with that particular node. The intelligent lighting nodes may acknowledge 304 the receipt of the controller that they've been successfully added to the controller table and wait for scene setting commands from the controller. In one example embodiment, after a node has acknowledged 304 addition to the controller table, the node may refrain from identifying itself to the controller for some time (a fixed interval determined by the controller). Such an embodiment may help reduce network traffic congestion. In the particular example shown, the controller initiates the node discovery process, however, each intelligent lighting node may actively communicate 302 its individual ID number and network address, without having first received a prompt from the system controller. Such an example would illustrate the dynamic self-identification capabilities of the intelligent nodal lighting system disclosed herein. In addition to intelligent lighting nodes, audio-visual nodes may also be discovered and assigned a network address during the node discovery process.

After discovering one or more intelligent lighting nodes, the nodes wait for scene settings to be communicated from the controller 305. Scene settings for a lighting node may include color, intensity, or quality information; while for an audio or visual node the scene settings may include sound, image, or video information. If a scene setting is not detected, the nodes may transmit a periodic pulse 306 to prevent the node from entering into power-save or "sleep" mode, which may cause undesired delay in the lighting system. If a scene setting is detected from the controller, the control unit of the lighting node may determine whether the scene setting is within the capabilities of the particular lighting node 307. If the lighting node is incapable of outputting the desired lighting setting, the node may calculate and output the closest possible lighting setting 310, as discussed in more detail above in reference to the scene setting estimation module. If the scene settings are within the capabilities of the particular lighting node, the node may then output the desired scene settings 308. While remaining in communication with the system controller, the intelligent lighting node may wait for new scene settings to be detected 309. If new settings are detected, the node may determine whether the settings are within the particular lighting unit capabilities 307, as discussed above, and act accordingly. If no new scene settings are detected, the node may continue outputting the desired scene settings 308.

In one particular example, the node discovery process described above may occur after one or more nodes have been discovered and are in the subsequent stages of the method described in FIG. 3. Such a case may occur when an additional node is dynamically added to the intelligent nodal lighting system, as discussed in reference to FIG. 2b above. The existing nodes may be in the process of interpreting commands from the system controller 307, or calculating the closest possible scene settings of a particular node 310, while the additional node is communicating identification information to the controller 302 or acknowledging 304 addition to the controller table. Alternatively, an intelligent lighting node may be dynamically removed from the system while it is outputting scene settings or receiving commands from the system controller, in which case the remaining nodes may begin receiving new scene settings 309 from the system controller in order to compensate for the node that was removed. In another example embodiment, the node discovery process may be performed one node at a time, or with multiple nodes being discovered simultaneously.

Contextual Lighting Environment

Figure 4A:
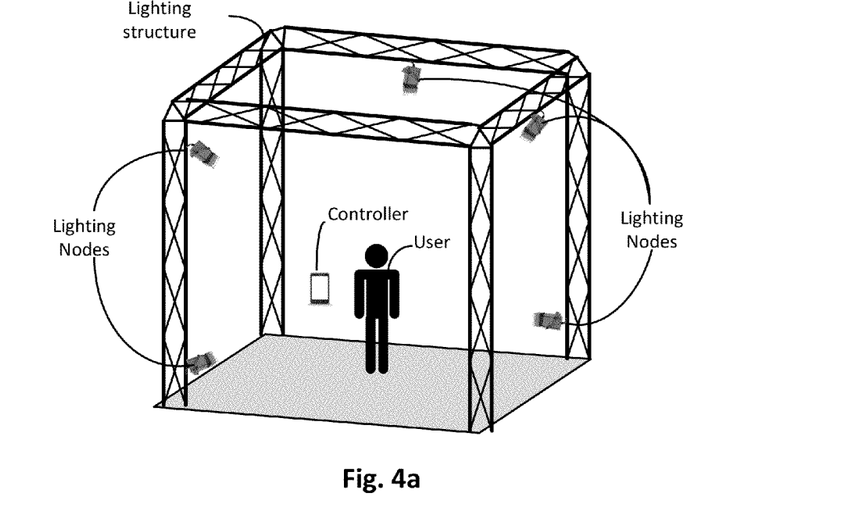
FIGS. 4a and 4b illustrate intelligent nodal contextual lighting system designs, according to embodiments of the present invention.
Figure 4B:
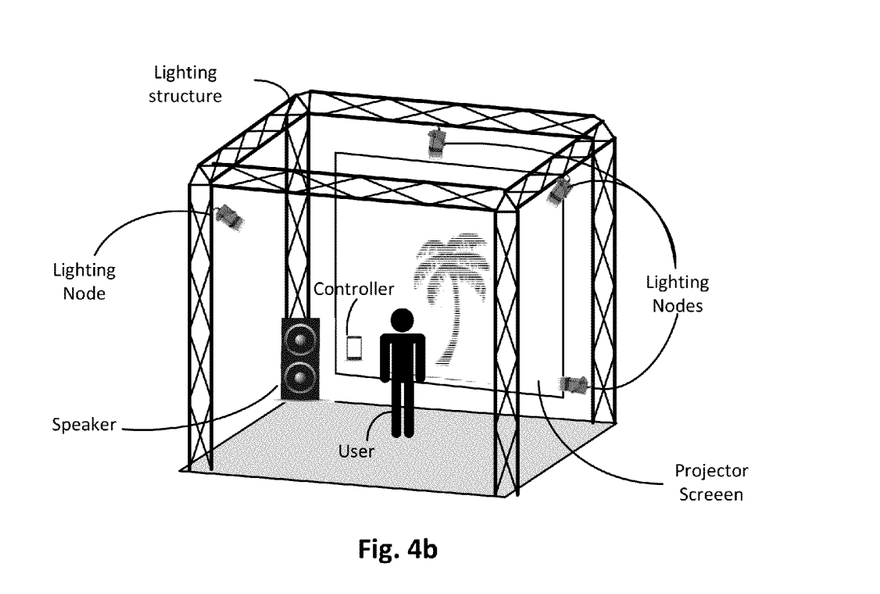

FIGS. 4a and 4b illustrate intelligent nodal contextual lighting system designs, according to embodiments of the present invention. FIG. 4a includes a lighting structure that may support the individual lighting nodes. The structure may be located in the dressing room of a store in order to provide a realistic lighting environment to a user prior to purchasing an item of clothing or an accessory; or the structure may be in a home, restaurant, theatre, or any other location where a user may desire a specialized contextual lighting environment. The lighting system may be wirelessly controlled by a controller that can be manipulated by the user. The controller may include pre-programmed lighting environments, such as a bright beach scene or a low-lit dinner party scene, or the controller may be in wireless communication with sensors or servers at a remote location that can transmit scene settings to the controller. In one such example, the scene settings may include scene settings measured in real-time from a remote location. The controller may communicate the pre-programmed or real-time measured scene settings to the lighting nodes to create a desired lighting experience. At any point, the user may manipulate the controller and transition from one lighting scene to another. This may be desirable if a user wants to see how an article of clothing or accessory will appear in various lighting environments.

In one embodiment, the lighting experience or environment created by the lighting system may be a dynamic lighting scene. Such a dynamic lighting scene may contain a series of points and timing information for one or more nodes within the system. In one such example embodiment, one or more nodes within the system may transition over a series of colors or light intensities over a specified time period and may loop or repeat that transition multiple times. Such a dynamic lighting scene may provide an even more immersive lighting experience than a static light setting. In other embodiments, a programmed lighting scene may include instructions that define ranges of colors, light intensities, audio or video outputs, or other settings; as well as a timing schedule for such settings. Such instructions may prompt one or more of the nodes to modulate color, intensity, volume, video output, or other settings according to the desired timing schedule. These instructions may include flickers, color changes, or randomizing factors for the settings and the timing schedule such that the entire scene (including the scene length itself) may be continually changing.

FIG. 4b illustrates an example contextual lighting system, including a projector screen and speaker for creating a more immersive lighting environment, according to one embodiment of the present invention. The lighting nodes may be mounted on a lighting structure, as disclosed above, and in this embodiment the user has selected a beach scene with the controller. A projector screen is shown in this example embodiment displaying a beach scene image or video, and a speaker may output wave sounds in order to create an immersive lighting experience enhanced by the visual and audio nodes. At any point, the user may select a different lighting scene with the controller. In one example, the user may select a dinner party scene, at which point the lighting levels may soften, the speaker may output suitable dinner party music, and the projector screen may display a suitable image or video, thus allowing the user to experience multiple lighting environments within the lighting system.

Numerous embodiments will be apparent, and features described herein can be combined in any number of configurations. One example embodiment of the present invention provides a nodal lighting system. The nodal lighting system includes a controller, at least one lighting node designed to wirelessly communicate with the controller, and a control unit within each of the lighting nodes configured to store and interpret commands from the controller. In some cases, the control unit is configured to provide identification information regarding the lighting node to the controller. In one such case, the system is configured to dynamically receive new lighting nodes, and lighting nodes may also be dynamically removed from the system during system operation. In some cases, the system includes a number of individual lighting nodes. In one such case, the lighting nodes are configured to wirelessly communicate with each other. In another such case, the lighting nodes are configured to recreate a lighting environment based on one or more light parameters measured in real-time at a remote location. In one such case, the system further includes a projector configured to display images from the remote location in concert with the lighting environment. In some cases, the system further includes an audio-visual node configured to receive commands from the controller. In some cases, either the controller or one of the lighting nodes is configured to receive scene setting information from a remote server. In some cases, the commands received from the controller include commands to display a desired light color, light intensity, or light quality. In some cases, the commands received from the controller include light setting commands and the control unit is configured to calculate closest possible light settings to the light setting commands that the at least one lighting node is capable of displaying.

Another embodiment of the present invention provides a method for displaying a lighting environment. The method includes assigning a network address to at least one lighting node, communicating scene setting commands from a controller to the lighting node, interpreting the scene setting commands at the lighting node, and outputting scene settings from the lighting node. In some cases, the scene setting commands include commands to display a desired light color, light intensity, or light quality. In some cases, the scene setting commands include instructions to modulate the light color or the light intensity over a given timing schedule. In one such case, the scene setting commands also include instructions to modulate the duration of the timing schedule, as well as instructions to repeat the timing schedule. In some cases, the method further includes communicating visual information to a visual display node. In some cases, interpreting the scene setting commands includes estimating closest possible light settings to the scene setting commands that the lighting node is capable of producing, and outputting the scene settings includes displaying the closest possible light settings. In some cases, the method includes a number of intelligent lighting nodes and each node may be controlled independently. In one such case, the lighting nodes are configured to communicate with each other. In another such case, the method further includes dynamically removing one of the lighting nodes from communication with the controller; and/or dynamically connecting an additional lighting node with the controller using a wireless connection. In some cases, the method further includes communicating identification information from the lighting node to the controller. Another embodiment of the present invention provides a contextual lighting system. In this example case, the system includes a wirelessly enabled system controller configured to store light settings for at least one contextual lighting scene. The system further includes a number of wirelessly enabled lighting nodes, and a control unit within each of the lighting nodes configured to receive the light settings from the system controller and intelligently interpret the light settings. In some cases, the contextual lighting scene includes instructions to modulate the light settings within a single lighting scene, as well as instructions to modulate the scene duration or the number of scene repetitions.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A nodal lighting system, comprising:
   a controller;
   a plurality of lighting nodes configured to wirelessly communicate with the controller;
   a control unit within each of the at least one lighting node configured to store and interpret commands received from the controller wherein the plurality of lighting nodes is configured to recreate a lighting environment of a remote location based on one or more light parameters measured in real-time at the remote location; and
   a projector configured to display images of the remote location in concert with the lighting environment.

2. The nodal lighting system of claim 1, wherein the control unit is configured to provide identification information regarding the lighting node to the controller.

3. The nodal lighting system of claim 2, wherein the system is configured to dynamically receive new lighting nodes and wherein lighting nodes may be dynamically removed from the system during system operation.

4. The nodal lighting system of claim 1, wherein each of the plurality of lighting nodes is configured to wirelessly communicate with each other.

5. The nodal lighting system of claim 1, further comprising the projector configured to display images from the remote location in concert with the lighting environment sequentially in real-time.

6. The nodal lighting system of claim 1, further comprising at least one audio-visual node configured to receive commands from the controller.

7. The nodal lighting system of claim 1, wherein at least one of the controller and the at least one lighting node is configured to receive scene setting information from a remote server.

8. The nodal lighting system of claim 1, wherein the commands received from the controller comprise commands to display at least one of a desired light color, light intensity, and light quality.

9. The nodal lighting system of claim 1, wherein the commands received from the controller comprise light setting commands, and wherein the control unit is configured to calculate closest possible light settings to the light setting commands that the at least one lighting node is capable of displaying.

10. A method of displaying a lighting environment, comprising:
    assigning a network address to at least one lighting node;
    communicating scene setting commands from a controller to the at least one lighting node wherein the scene setting commands comprise instructions to modulate, over a timing schedule, at least one of: light color and light intensity;
    interpreting the scene setting commands at the at least one lighting node wherein interpreting the scene setting commands comprises estimating closest possible light settings to the scene setting commands that the at least one lighting node is capable of producing, and wherein outputting scene settings comprises displaying the closest possible light settings; and
    outputting scene settings from the at least one lighting node.

11. The method of claim 10, wherein the scene setting commands comprise commands to display at least one of a desired light color, light intensity, and light quality.

12. The method of claim 11, wherein the scene setting commands further comprise instructions to modulate the duration of the timing schedule and to repeat the timing schedule.

13. The method of claim 10, further comprising communicating visual information to a visual display node.

14. The method of claim 10, wherein the at least one lighting node comprises a plurality of intelligent lighting nodes, each of which may be controlled independently.

15. The method of claim 14, wherein the plurality of intelligent lighting nodes are configured to communicate with each other.

16. The method of claim 14, further comprising at least one of:
    dynamically removing one of the plurality of intelligent lighting nodes from communication with the controller; and/or dynamically connecting an additional lighting node with the controller using a wireless connection.

17. The method of claim 10, further comprising communicating identification information from the at least one lighting node to the controller.

18. A contextual lighting system, comprising:
- a wirelessly enabled system controller, configured to store light settings for at least one contextual lighting scene;
- a plurality of wirelessly enabled lighting nodes; and
- a control unit within each of the plurality of wirelessly enabled lighting nodes configured to receive the light settings from the system controller and intelligently interpret the light settings wherein interpreting the scene setting commands comprises estimating closest possible light settings to the scene setting commands that the at least one lighting node is capable of producing, and wherein outputting scene settings comprises displaying the closest possible light settings and communicating estimated closest possible light settings to the wirelessly enabled system controller.

19. The contextual lighting system of claim 18, wherein the contextual lighting scene includes instructions to modulate the light settings within a single lighting scene, as well as modulate at least one of: scene duration and scene repetition.

* * * * *